United States Patent
Horii et al.

(10) Patent No.: US 10,896,169 B2
(45) Date of Patent: Jan. 19, 2021

(54) DISTRIBUTED SYSTEM, COMPUTER PROGRAM PRODUCT AND METHOD

(71) Applicant: INTERNATIONAL BUSINESS MACHINES CORPORATION, Armonk, NY (US)

(72) Inventors: Hiroshi Horii, Tokyo (JP); Akihiko Tozawa, Tokyo (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 239 days.

(21) Appl. No.: 15/594,235

(22) Filed: May 12, 2017

(65) Prior Publication Data

US 2018/0329944 A1   Nov. 15, 2018

(51) Int. Cl.
| | |
|---|---|
| *G06F 16/00* | (2019.01) |
| *G06F 16/23* | (2019.01) |
| *G06F 9/48* | (2006.01) |
| *G06F 9/52* | (2006.01) |
| *G06F 9/46* | (2006.01) |
| *G06F 16/27* | (2019.01) |

(52) U.S. Cl.
CPC .......... *G06F 16/2379* (2019.01); *G06F 9/466* (2013.01); *G06F 9/485* (2013.01); *G06F 9/528* (2013.01); *G06F 16/2365* (2019.01); *G06F 16/27* (2019.01)

(58) Field of Classification Search
CPC . G06F 17/30377; G06F 16/2379; G06F 16/27
USPC ................................................ 707/703, 690
See application file for complete search history.

(56) References Cited

U.S. PATENT DOCUMENTS

| | | | |
|---|---|---|---|
| 9,230,000 B1* | 1/2016 | Hsieh | G06F 16/2343 |
| 2011/0055169 A1* | 3/2011 | Yalamanchi | G06F 16/2365 |
| | | | 707/690 |
| 2014/0372438 A1 | 12/2014 | Chandramouli et al. | |

FOREIGN PATENT DOCUMENTS

WO   WO 2016046820   3/2016

OTHER PUBLICATIONS

"Gargamel: Boosting DBMS performance by parallelising write transactions"; By: Pierpaolo Cincilla https://hal.archives-ouvertes.fr/tel-01108975 (Year: 2015).*

(Continued)

*Primary Examiner* — Chelcie L Daye
(74) *Attorney, Agent, or Firm* — Tutunjian & Bitetto, P.C.; Randall Bluestone (57) ABSTRACT

A distributed system is provided that includes member nodes and a leader node. Each member node stores a database and updates the database by performing common ones of a plurality of transactions. The leader node generates a batch, to be executed by each member node, which includes two or more transactions lacking an access conflict from among the plurality of transactions. The leader node includes: a section that generates an access set as a set of database entries to be accessed by each transaction to be executed; a section that generates the batch, based on the access set of each transaction to be executed; and a leader-side section that performs a consensus process for the batch among the leader and member nodes. Each member node includes the database; a member-side section that performs a consensus process for the batch; and a section that performs parallel execution of batch transactions.

6 Claims, 6 Drawing Sheets

(56) References Cited

OTHER PUBLICATIONS

International Search Report and Written Opinion dated Mar. 5, 2018 for International Application No. PCT/EP2017/081728.
Cincilla, Pierpaolo, "Gargamel: Boosting DBMS Performance by Parallelising Write Transactions", HAL Archives-ouvertes, Jan. 2015, 164 pages.

* cited by examiner

DISTRIBUTED SYSTEM, COMPUTER PROGRAM PRODUCT AND METHOD

BACKGROUND

Technical Field

The present invention relates to a distributed system, a computer program product, and a method.

Related Art

Conventionally, a distributed system using technology referred to as a blockchain is being developed.

In a distributed system, it is necessary to perform read and write transactions while achieving synchronization between nodes, and since it is possible for an access conflict to occur between transactions, the transaction processing is slowed.

SUMMARY

According to a first aspect of the present invention, a distributed system is provided. The distributed system includes a plurality of member nodes that each store a database of replica of common data and update the database by performing common ones of a plurality of transactions. The distributed system further includes a leader node that generates a batch that includes two or more transactions that lack an access conflict from among the plurality of transactions and is to be executed by each of the plurality of member nodes. The leader node includes an access set generating section that generates an access set, which is a set of database entries to be accessed by each of the plurality of transactions to be executed. The leader node further includes a batch generating section that generates the batch including two or more transactions that lack the access conflict, based on the access set of each of the plurality of transactions to be executed. The leader node also includes a leader-side consensus processing section that performs a process to reach a consensus for the batch among the leader node and the plurality of member nodes. Each of the plurality of member nodes includes the database. Each of the plurality of member nodes further includes a member-side consensus processing section that performs a process to reach a consensus for the batch. Each of the plurality of member nodes also includes a member-side transaction processing section that performs parallel execution of any of the plurality of transactions included in the batch. The first aspect may be operable to speed of the transaction processing, in a state where access conflicts among the transactions of each member node have been avoided.

In the first aspect, each of the plurality of member nodes may further include a checking section that checks whether there is an access conflict among the two or more transactions included in the batch. In this case, it is possible to improve the Byzantine fault tolerance of the distributed system.

The first aspect may further include a leader switching section that switches the leader node to another node in at least one of a case where a consensus for the batch is not reached among the leader node and the plurality of member nodes and a case where the number of nodes that have checked there is access conflict among the two or more transactions among the plurality of member nodes is greater than a threshold value. In this case, it is therefore possible to switch out an incorrect leader.

According to a second aspect of the present invention, a computer program product is provided. The computer program product includes a computer readable storage medium having program instructions embodied therewith. The program instructions are executable by a computer to cause the computer to perform a method. The method includes generating an access set, which is a set of database entries to be accessed by each of a plurality of transactions, which are to be executed for a database of replica of common data in each of a plurality of member nodes that each store the database. The method further includes generating a batch that is to be executed by each of the plurality to member nodes and includes two or more transactions that lack an access conflict, based on the access set of each of the plurality of transactions to be executed. The method also includes performing a process to reach a consensus for the batch among the plurality of member nodes. The second aspect may be operable to speed of the transaction processing, in a state where access conflicts among the transactions of each member node have been avoided.

According to a third aspect of the present invention, a computer program product is provided. The computer program product includes a computer readable storage medium having program instructions embodied therewith. The program instructions are executable by a computer of a member node to cause the computer to perform a method. The method includes performing a process to reach a consensus for a batch, which includes two or more transactions that lack an access conflict and is generated by a leader node that generates the batch to be executed for a database of replica of common data stored by each of a plurality of member nodes. The method further includes performing parallel execution of the two or more transactions included in the batch. The method also includes checking whether there is an access conflict among the two or more transactions included in the batch. The third aspect may be operable to speed of the transaction processing, in a state where access conflicts among the transactions of each member node have been avoided.

These and other features and advantages will become apparent from the following detailed description of illustrative embodiments thereof, which is to be read in connection with the accompanying drawings.

DETAILED DESCRIPTION

Hereinafter, example embodiments of the present invention will be described. The example embodiments shall not limit the invention according to the claims, and the combinations of the features described in the embodiments are not necessarily essential to the invention.

(1. Configuration of the Distributed System)

Figure 1:
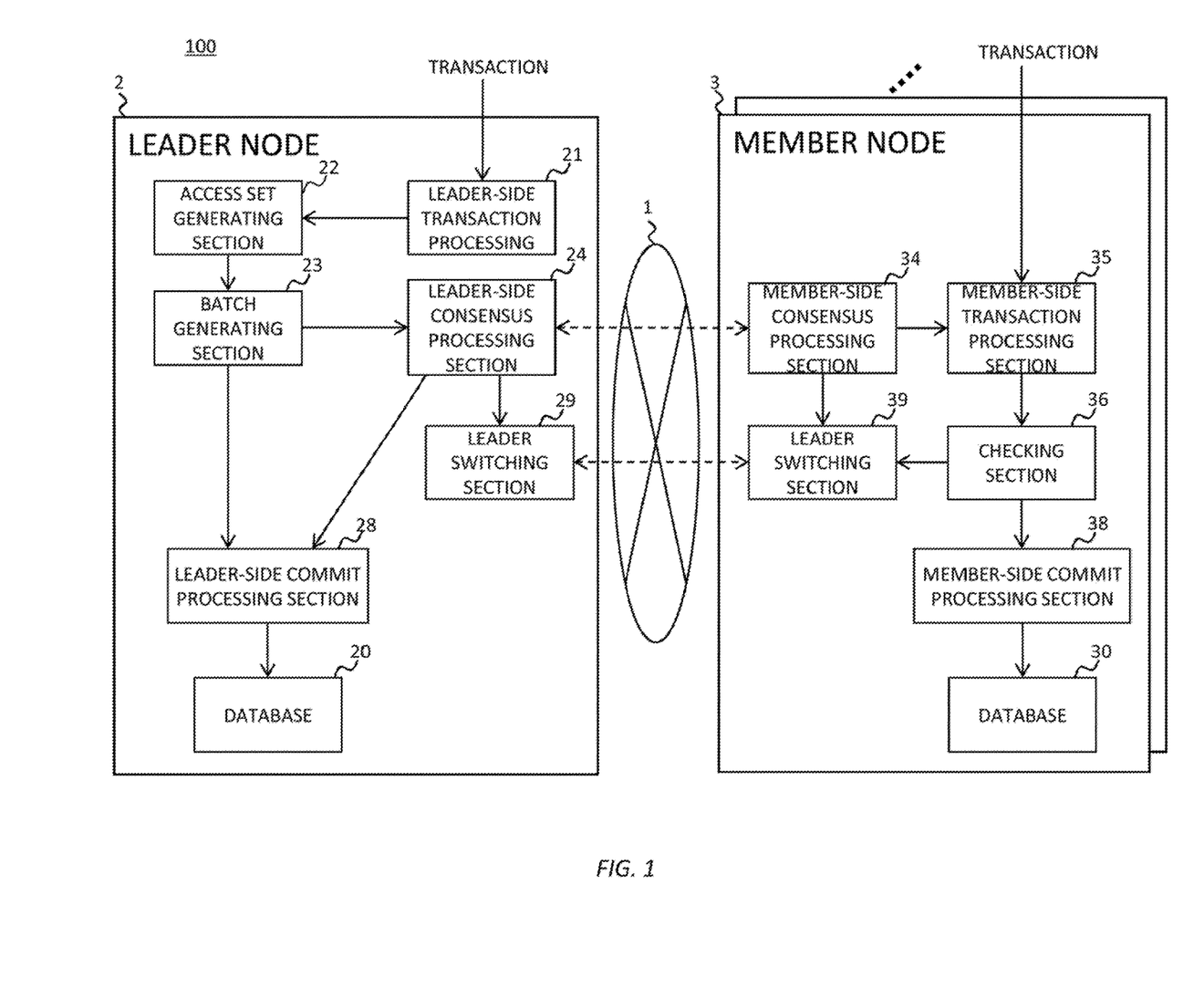
FIG. 1 shows a distributed system, in accordance with an embodiment of the present embodiment.

FIG. 1 shows a distributed system 100 according to the present embodiment. The distributed system 100 is a system that distributes and manages a database of replica of common data among a plurality of nodes, e.g., nodes installed by a bank or a securities firm, using blockchain technology such as Fabric. Specifically, in the system, each node stores or manages the database of replica of common data to maintain the same content, and continues updating each database in the same manner by executing transactions that are common to each node. The distributed system 100 includes a network 1, a leader node 2, and a plurality of member nodes 3 that each store a database of replica of common data 30. Here, Fabric is block chain software (https://hyperledger-fabric-.readthedocs.io/en/latest/).

(1-1. Network)

The network 1 may be configured to include any of various networks such as the Internet, a wide area network (WAN), or a local area network, or a combination of these networks. The network 1 may include a connection through at least one of a wired network and a wireless network at each connection point.

(1-2. Leader Node)

The leader node 2 generates a batch to be executed by each of the plurality of member nodes 3 for the databases 30, in order to synchronize data updates among the databases 30 for the plurality of member nodes 3. Here, the batch is a compilation of a plurality of processes to be processed en masse, and includes two or more transactions to be executed for a database 30. A transaction to be executed for a database 30 is an inseparable series of information processes that is executed for the database, and may include one or more read/write processes for the database 30, for example.

The leader node 2 includes a leader-side transaction processing section 21, an access set generating section 22, a batch generating section 23, a leader-side consensus processing section 24, a leader-side commit processing section 28, a leader switching section 29, and a database 20.

The database 20 is a database of data that is common to the databases 30 of the plurality of member nodes 3. The database 20 may be a key-value store (KVS) that stores keys and values in association with each other. The database 20 does not need to be implemented in the leader node 2.

The leader-side transaction processing section 21 executes the transactions included in the batch in parallel. In the present embodiment, as an example, the leader-side transaction processing section 21 executes the transactions in a newly generated batch, but the leader-side transaction processing section 21 may instead execute the transactions in a previously generated batch. Here, parallel execution may be the parallel execution of transactions according to the maximum number of cores in a multiprocessor, or may be the execution of a greater number of transactions according to multitasking of each core. Transactions to be executed for the database 20 may be sequentially supplied to and cumulatively stored in the leader-side transaction processing section 21, from each of the plurality of nodes. The leader-side transaction processing section 21 may supply the access set generating section 22 with results of the executed transactions.

The access set generating section 22 generates an access set, which is a set of database entries to be accessed by each of the plurality of transactions to be executed. Here, database entries to be accessed by a transaction may be one or more entries that are read targets of one or more values (v) by the transaction (referred to as a read set R), and, one or more entries that are write targets of one or more values (v) by the transaction. Each entry may be identified by a key (k). For example, the read set R and the write set W of a transaction $tx_0$ to be executed may respectively be a key $k_1$ and a key $k_1$. In this case, the access set generating section 22 may generate {key $k_1$} which is the read set R and {key $k_1$} which is the write set W as the access set for the transaction $tx_0$. In the present embodiment, as an example, the write set W may further include one or more values corresponding to each key (entry). The contents of access sets for the same transaction may change according to the state of the database 20. For example, a transaction may include a conditional branch corresponding to the state of the database 20, and the contents of this access set can change according to the processing after the branch.

The access set generating section 22 may supply the batch generating section 23 with the generated access set in association with the contents or identification information of the transaction set. The access set generating section 22 may further supply the batch generating section 23 with an execution result of the transaction in association with the access set.

The batch generating section 23 generates a batch including two or more transactions that do not have (i.e., that lack) an access conflict, based on the respective access sets of the plurality of transactions to be executed. An access conflict may be separate transactions performing reading and writing for the same entry, may also be each of these transactions performing writing. The batch may include the actual contents of the transactions, or may include identification information of the transactions. The batch generating section 23 may supply the leader-side consensus processing section 24 with the generated batch. Furthermore, the batch generating section 23 may supply the leader-side commit processing section 28 with execution results of the transactions included in the generated batch. The execution results of the transactions may be supplied directly to the leader-side commit processing section 28 from the leader-side transaction processing section 21 without passing through the batch generating section 23.

The leader-side consensus processing section 24 performs a process to reach a consensus for the batch, among the leader node 2 and the plurality of member nodes 3. Reaching a consensus for a batch among the leader node 2 and the plurality of member nodes 3 may be confirming that, among leader node 2 and all of the member nodes 3, the batch contents of the communication target are the same among a number of nodes greater than a threshold value, for example. The threshold value may be ⅔ of the total number of nodes in the distributed system 100 or may be the total number of nodes, for example. The leader-side consensus processing section 24 may supply the leader-side commit processing section 28 and the leader switching section 29 with a judgment result concerning whether a consensus was reached.

The leader-side commit processing section 28 commits two or more transactions, e.g., each transaction, in the batch, in response to a consensus being formed for the batch among the leader node 2 and the plurality of member nodes 3. For example, the leader-side commit processing section 28 may update the database 20 according to the execution results of the transactions by the leader-side transaction processing section 21.

The leader switching section 29 switches the leader node 2 to another node, that is, the leader switching section 29 performs so-called "view change" if a failure causing an outage or a Byzantine failure occurs in the distributed system 100. For example, in at least one of a case where a consensus for the batch is not reached among the leader node 2 and the plurality of member nodes 3 and a case where the number of nodes that have checked there is access conflict among the two or more transactions and agreed to switch the leader node 2 among the plurality of member nodes 3 is greater than the threshold value, the leader switching section 29 may switch the leader node 2 to another node. The leader switching section 29 may supply the data gathering apparatus described above with identification information of the new leader node 2.

(1.3 Member Nodes)

The plurality of member nodes 3 each store a database of replica of common data 30 and each perform a common transaction to update the database 30. Each of the plurality of member nodes 3 includes the database 30, a member-side consensus processing section 34, a member-side transaction processing section 35, a checking section 36, a member-side commit processing section 38, and a leader switching section 39.

The member-side consensus processing section 34 performs a process to reach a consensus for the batch among the leader node 2 and the member nodes 3. The member-side consensus processing section 34 may supply the member-side transaction processing section 35 and the leader switching section 39 with the judgment result concerning whether a consensus has been reached. Furthermore, the member-side consensus processing section 34 may supply the member-side transaction processing section 35 with the batch for which a consensus has been reached.

The member-side transaction processing section 35 executes the plurality of transactions in the batch in parallel. If the actual content of a transaction is included in the batch, the member-side transaction processing section 35 may execute this transaction. If identification information of a transaction is included in the batch, the content of the transaction to be executed for the database 30 may be sequentially supplied to and cumulatively stored in the member-side transaction processing section 35 from the data gathering apparatus described above. The member-side transaction processing section 35 may execute a transaction corresponding to the identification information in the batch, from among the plurality of transaction supplied thereto. Transactions to be executed for the database 30 may be sequentially supplied to and cumulatively stored in the member-side transaction processing section 35, from each of the plurality of nodes. The transactions supplied to the member-side transaction processing section 35 may have the same content as the transactions supplied to the leader-side transaction processing section 21. The member-side transaction processing section 35 may supply the checking section 36 with the execution results of the transactions.

The checking section 36 checks whether there is an access conflict among the plurality of transactions in the batch. For example, the checking section 36 may check whether there is an access conflict among all of the transactions in the batch. The checking section 36 may supply the member-side commit processing section 38 with the check results along with the execution results of the transaction in the batch. Furthermore, the checking section 36 may supply the leader switching section 39 with the check results.

The member-side commit processing section 38 commits the plurality of transactions, on the condition that there are no access conflicts among these transactions in the batch. For example, the member-side commit processing section 38 may update the database 20 according to the execution result of each transaction by the member-side transaction processing section 35, on the condition that a check result indicating that there are no access conflicts has been supplied from the checking section 36.

The leader switching section 39 may switch the leader node 2 to another node, in the same manner as the leader switching section 29 of the leader node 2.

With the distributed system 100 described above, the leader node 2 generates each access set of a plurality of transactions to be executed and, based on these access sets, generates a batch including two or more transaction that do not have an access conflict. Accordingly, it is possible to execute the plurality of transactions in the batch in parallel, in a state where access conflicts among the transactions of each member node 3 have been avoided. Accordingly, it is possible to increase the speed of the transaction processing with the member nodes 3.

Since a consensus for the batch is reached among the leader node 2 and the plurality of member nodes 3, it is possible to reliably synchronize the contents of the databases 20 and 30 of each node. Furthermore, it is possible to improve the durability of the distributed system 100 to failure causing an outage.

Since each of the plurality of member nodes 3 uses the checking section 36 to check whether there is an access conflict among the plurality of transactions in the batch, it is possible to detect that the leader node 2 is incorrect. Accordingly, it is possible to improve the Byzantine durability of the distributed system 100.

Each of the plurality of member nodes 3 may be operable to commit the plurality of transactions with the member-side commit processing section 38, on the condition that there is no access conflict among the plurality of transactions in the batch. Accordingly, it is possible to avoid committing an incorrect batch.

In at least one of a case where a consensus for the batch cannot be reached among the leader node 2 and the plurality of member nodes 3 and a case where the number of nodes that have checked there is access conflict among the two or more transactions and agreed to switch the leader node 2 among the plurality of member nodes 3 is greater than the threshold value, the leader switching sections 29 and 39 switch the leader node 2 to another node. Accordingly, it is possible to switch out an incorrect leader.

(2. Outline of the Method)

Figure 2:
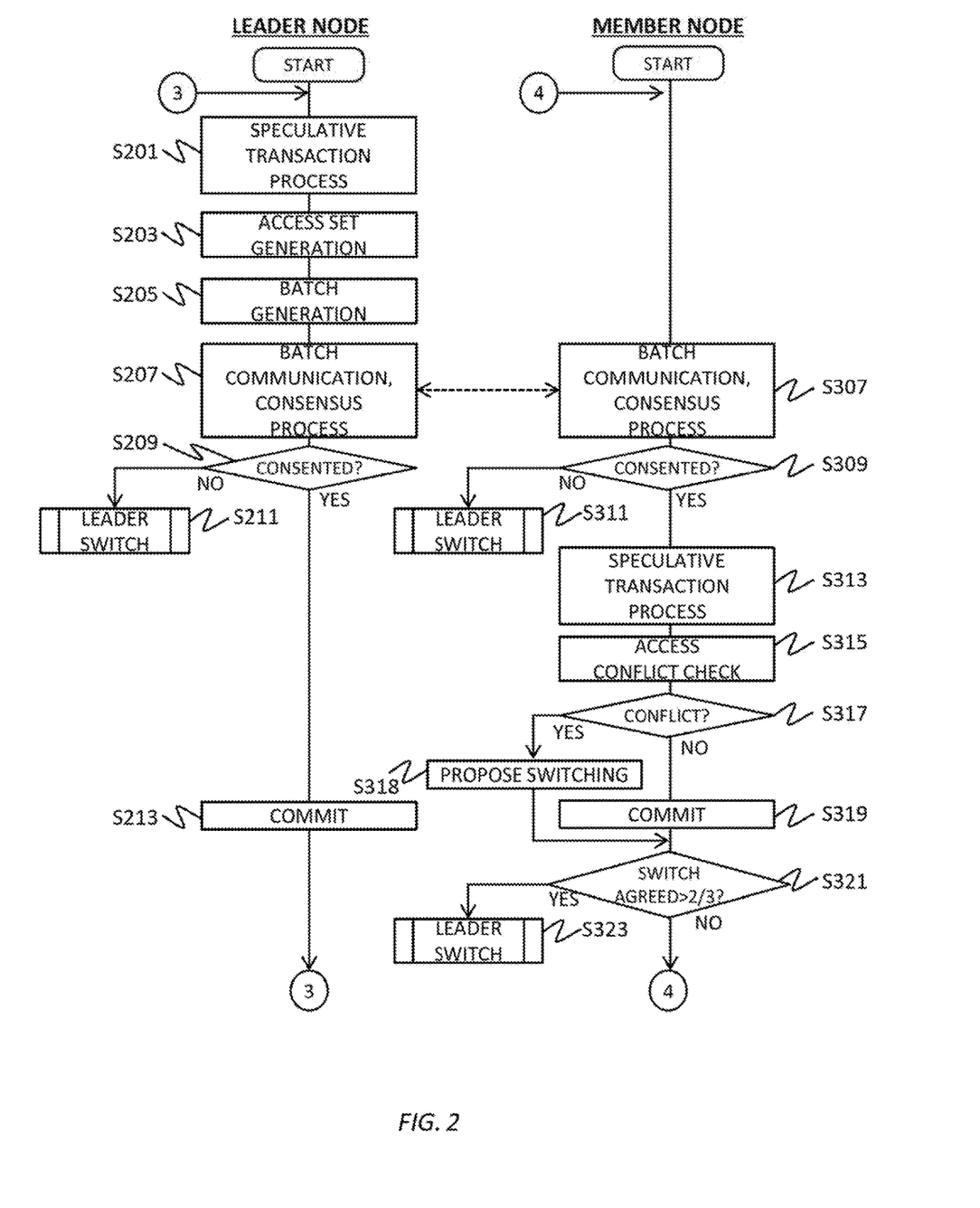
FIG. 2 shows a method executed by the distributed system, in accordance with an embodiment of the present embodiment.

FIG. 2 shows a method executed by the distributed system 100. By executing the processes from S201 to S213 and from S307 to S323, the distributed system 100 executes transactions while achieving synchronization with each node.

First, the leader-side transaction processing section 21 in the leader node 2 may execute a plurality of transactions in the batch in parallel (step S201). In the present embodiment, as one example, the leader-side transaction processing section 21 may perform speculative execution of the plurality of transactions in a newly generated batch. Here, speculative execution of a transaction may be, before checking whether to commit a transaction, executing this transaction in advance while maintaining the content of the database 20. In other words, speculative execution is execution beginning with transactions for which a determination concerning whether to execute the transaction has not yet been made.

Next, the access set generating section 22 may generate an access set of each transaction to be executed (step S203). For example, the access set generating section 22 may generate an access set of each transaction to be executed based on the results of the speculative execution performed by the leader-side transaction processing section 21.

Next, the batch generating section 23 may generate a batch including two or more transactions that do not have an access conflict, based on the generated plurality of access sets (S205).

Next, the leader-side consensus processing section 24 may reach a consensus for the batch by communicating the generated batch among the member-side consensus processing sections 34 of the plurality of member nodes 3 (S207). For example, the leader-side consensus processing section 24 may transmit the batch supplied from the batch generating section 23 to the member nodes 3. The leader-side consensus processing section 24 may reach a consensus for the batch using a protocol such as PBFT (Practical Byzantine Fault Tolerance), PoW (Proof of Work), Raft, Paxos, or Sieve.

Next, the leader-side consensus processing section 24 may judge whether a consensus has been reached for the batch (S209). If it is judged that a consensus has not been reached (S209: No), the leader switching section 29 may perform the leader switching process described further below (step S211). The leader-side consensus processing section 24 may judge that a consensus has not been reached if a time-out occurs. If it is judged that a consensus has not been reached, the leader node 2 may again perform the processes from step S201 to step S207 after restarting, and may perform the leader switching process if a consensus has still not been reached.

If it is judged that a consensus has been reached at step S209 (S209: Yes), the leader-side commit processing section 28 may commit the plurality of transactions in the batch (step S213).

When the process of step S213 has ended, the leader node 2 may move the process to step S201 described above. In this way, after the plurality of transactions in the batch that has been generated have been committed at step S213, the leader-side transaction processing section 21 starts the speculative execution for the remaining transactions to generate the next batch.

For transactions that did not have a write-read conflict with other transactions that had already been executed to generate the previous batch during the generation of the next batch, the leader-side transaction processing section 21 may use the previous speculative execution results. For example, among one or more transactions that had an access conflict with another transaction included in the batch according to the speculative execution, the leader-side transaction processing section 21 may continue to use the previous speculative execution results for a transaction whose reading is not in conflict with the writing of each other transaction included in the batch. As an example, the leader-side transaction processing section 21 may continue to use the previous speculative execution results for a transaction whose writing is in conflict with the writing each other conflict and/or a transaction whose writing is in conflict with the reading of each other transaction.

With such a transaction, even when a new speculative execution is performed after each transaction in the batch is committed, the read values do not change from the previous speculative execution, and therefore the results do not change. Therefore, repetitive performance of the speculative execution with the same content is prevented. For a transaction whose reading is in conflict with the reading of another transaction, the read value, and therefore the result, changes when a new speculative execution is performed after each transaction in the batch is committed. Therefore, the leader-side transaction processing section 21 may perform the speculative execution again in the next batch generation for such transactions.

On the other hand, in a member node 3, in response to the batch being transmitted from the leader-side consensus processing section 24 at step S207 described above, the member-side consensus processing section 34 may reach a consensus for the batch among the leader node 2 and the plurality of member nodes 3 (S307). For example, the member-side consensus processing section 34 may communicate with the leader node 2 and one or more other member nodes 3 to receive the batch, and reach a consensus with the communication partners.

Next, the member-side consensus processing section 34 may judge whether a consensus has been reached for the batch (step S309). If it is judged that a consensus has not been reached in step S309 (S309: No), the leader switching section 39 may perform the leader switching process described further below (step S311). The member-side consensus processing section 34 may judge that a consensus has not been reached if a time-out occurs. If it is judged that a consensus has not been reached, the member node 3 may again perform the process of step S307 after restarting, and may perform the leader switching process if a consensus has still not been reached.

If it is judged that a consensus has been reached at step S309 (S309: Yes), the member-side transaction processing section 35 may execute the plurality of transactions in the batch in parallel (step S313). The member-side transaction processing section 35 may perform speculative execution of the transactions.

Next, the checking section 36 checks whether there is an access conflict among the plurality of transactions in the batch (step S315), and may judge whether there is an access conflict (step S317).

If there is an access conflict at step S317 (S317: Yes), the member node 3 may judge that the batch set sent from the leader 2 was fallacy, and either propose or agree to switch the leader by communicating with the leader switching section 39 (step S318). Instead, if there is an access conflict at step S317 (S317: Yes), the member node 3 may again perform the processes of steps S313 to S317, and move the process to step S318 if there is still an access conflict.

On the other hand, if there is no access conflict at step S317 (S317: No), the member-side commit processing section 38 may commit the plurality of transactions in the batch (step S319). The process of step S319 may be performed after the process of step S313, without performing the processes of steps S315 to S317. In this case, the member node 3 does not need to include the checking section 36.

Next, the leader switching section 39 may communicate with the other member nodes 3 and judge whether the number of member nodes 3 that have agreed to switch the leader, is greater than a threshold value, which in the present embodiment is the number of all of the nodes or ⅔ of the number of the nodes in the distributed system 100, for example (step S321). Step S321 may be performed at the same time as step S319 or before step S319.

If it is judged that the number of member nodes 3 that have agreed to switch the leader is less than or equal to the threshold value at step S321 (S321: No), the member node 3 may move the process to step S307 described above. On the other hand, if it is judged that the number of member nodes 3 that have agreed to switch the leader is greater than the threshold value at step S321 (S321: Yes), the leader switching section 39 may perform the leader switching process described further below (step S323).

With the method described above, the access set generating section 22 generates an access set of each transaction based on the results of the speculative execution. Accordingly, the generation timing of the access set, and therefore the synchronization timing among the leader node 2 and the plurality of member nodes 3, can be made earlier.

Furthermore, the leader-side commit processing section 28 commits the plurality of transactions in the batch in response to a consensus being reached for the batch among the leader node 2 and the plurality of member nodes 3. Accordingly, it is possible to reliably perform synchronization among the leader node 2 and the plurality of member nodes 3.

Yet further, after a plurality of transactions in the batch have been committed, the leader-side transaction processing section 21 begins the speculative execution for the remaining transactions to generate the next batch. Accordingly, it is possible to prevent pointless speculative execution for generating the next batch if there is a current transaction that is not committed.

(2-1. Leader Switching Process)

Figure 3:
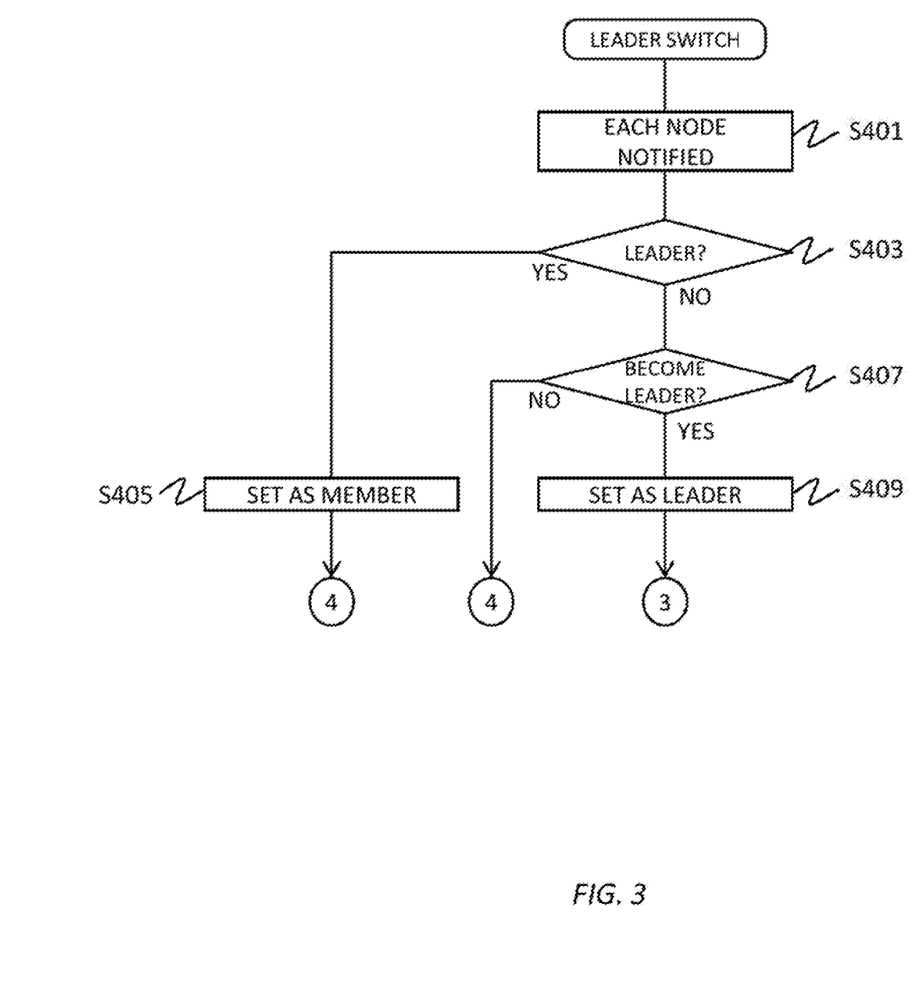
FIG. 3 shows a method executed by the distributed system, in accordance with an embodiment of the present embodiment.

FIG. 3 shows the leader switching process. The leader switching sections 29 and 39 switch the leader node 2 by performing the processes of S401 to S409 if a consensus is not reached for a batch or if the number of member nodes 3 that have checked there is access conflict among the transactions in the batch and agreed to switch the leader node 2 is greater than a threshold value.

First, the leader switching sections 29 and 39 perform communication among the leader node 2 and the plurality of member nodes 3, and provide notification that the leader switching process will be performed (step S401).

Next, each of the leader switching sections 29 and 39 may judge whether its own node is currently the leader node 2 (step S403). For example, each of the leader switching sections 29 and 39 judges whether it personally is the leader switching section 29.

If it is judged that its own node is the leader node 2 at step S403 (S403: Yes), the leader switching section 29 may set its own node, which is the leader node 2, to be a member node 3 (step S405). For example, the leader switching section 29 disables the functions of each configurational element of the leader node 2 installed in its own node and enables the functions of each configurational element of a member node 3, thereby switching from the operation of its own node to operating as a member node 3.

Then, when step S405 has ended, the leader switching section 39 that has been newly enabled in its own node may end the leader switching process and move to step S307 in FIG. 2. When ending the leader switching process, each node may return the state of the databases 20 and 30 to the state existing before each transaction included in the batch that caused the leader switching process to be executed was committed.

On the other hand, if it is judged that its own node is not the leader node 2, i.e., that its own node is a member node 3, at step S403 (S403: No), the leader switching section 39 may perform a selection of the leader node 2 among the leader switching sections 39 in the plurality of other member nodes 3 and judge whether its own node will become the leader node 2 (step S407).

Here, various methods can be used to select the leader node 2. For example, a selection ordering of the leader node 2 may be set in advance for the leader node 2 and each member node 3 in the distributed system 100, and the member node 3 that is set next after the current leader node 2 in this ordering may be selected as the leader node 2.

Alternatively, a member node 3 that has obtained a reference number of votes, e.g., a majority of votes, according to random voting among the plurality of member nodes 3 in the distributed system 100 may be set as the leader node 2. Alternatively, one of the plurality of member nodes 3 may be selected as the leader node 2 according to a setting made by a manager of the distributed system 100.

If it is judged that its own node is not to become the leader node 2 at step S407 (S407: No), the leader switching section 39 may end the leader switching process and move to step S405 described above.

On the other hand, if it is judged that its own node is to become the leader node 2 at step S407 (S407: Yes), the leader switching section 39 may set its own node, which is a member node 3, to be the leader node 2, in the same manner as in step S405 described above (step S409).

Then, when step S409 ends, the newly enabled leader switching section 29 in this node may end the leader switching process and move to step S201 in FIG. 2.

(2-2. Details of a Portion of Processing Content)

Figure 4:
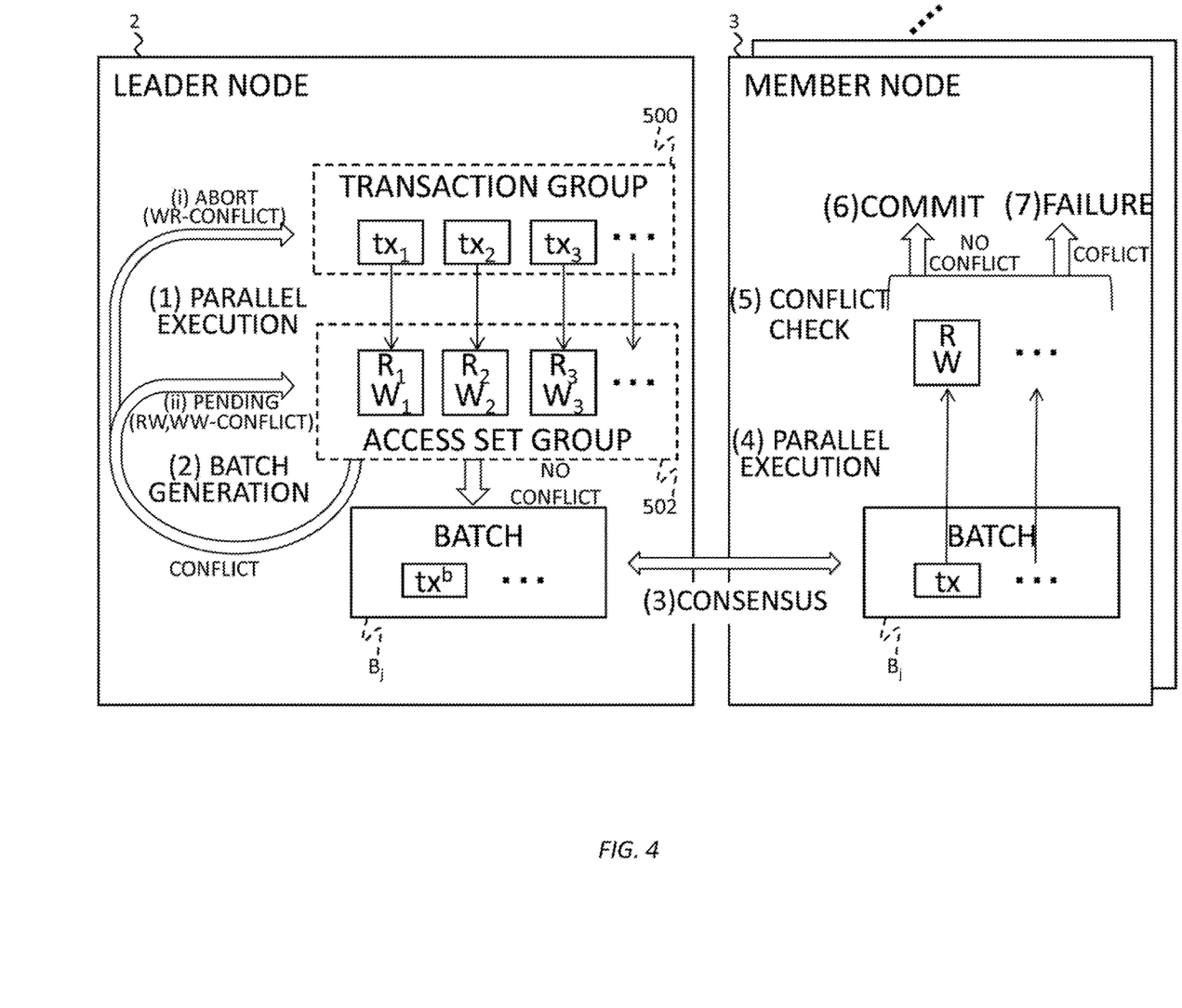
FIG. 4 shows an outline of a portion of the processing content of the distributed system, in accordance with an embodiment of the present embodiment.

FIG. 4 shows an outline of a portion of the processing content of the distributed system 100.

First, in the leader node 2, the leader-side transaction processing section 21 may speculatively perform parallel execution of a plurality of transactions $tx_1$, $tx_2$, etc. in a newly generated batch $B_j$ (Part (1)).

For example, the leader-side transaction processing section 21 may execute transactions tx that are still not included in the batch, from the group 500 of transactions tx to be executed. The leader-side transaction processing section 21 may prioritize execution of older transactions tx. Furthermore, the leader-side transaction processing section 21 may speculatively execute transactions tx using the current state $S_j$ (j is a natural number) of the database without changing this state $S_j$. In the present embodiment, as an example, previous batches $B_0$, $B_1$, $B_{j-1}$ have already been committed by each node at the timing when the batch $B_j$ is generated.

Next, the access set generating section 22 may generate an access set group 502 that includes each access set (a read set $R_i$ and a write set $W_i$ (i is a natural number)) of each of the plurality of transactions $tx_1$, $tx_2$, etc. that have been executed.

Next, the batch generating section 23 may generate the batch $B_j$ including two or more transactions tx that do not have an access conflict (Part (2)). For example, if there is no access conflict between an access set $(R_1, W_1)$ of a transaction $tx_i$ included in the access set group 502 and the access set $(R^b_j, W^b_j)$ of each transaction $tx^b$ already included in the batch $B_j$, the batch generating section 23 may add the transaction $tx_i$ to the batch $B_j$. As an example, if there is no access conflict for any of the combinations of $(W^b_j, R_i)$, $(W^b_j, W_i)$, and $(R^b_j, W_i)$, i.e., if the elements are relatively prime in every combination, the batch generating section 23 may add the transaction $tx_i$ to the batch $B_j$. The batch generating section 23 may check whether there is an access conflict using a single thread in order from the oldest transaction tx.

If the elapsed time from when the generation of the batch $B_j$ started exceeds a reference time, e.g., 2 seconds, the batch generating section 23 may cause the process to time out and confirm the content of the batch $B_j$. Furthermore, the batch generating section 23 may confirm the content of the batch $B_j$ at the timing when the number of transactions tx included in the batch $B_j$ exceeds a reference number, e.g., 500.

If the content of the batch has been confirmed, the batch generating section 23 may delete the results of the speculative execution for the transaction $tx_i$ that has an access conflict in the combination ($W^b_j$, $R_i$).

Furthermore, the batch generating section 23 may make the results of the speculative execution pending for a transaction $tx_i$ that has an access conflict with a combination other than ($W^b_j$, $R_i$), i.e., the combination ($W^b_j$, $W_i$) or the combination ($R^b_j$, $W_i$), and add this access set ($R_i$, $W_i$) to a pending set $P_j$ (Part (ii)). Here, the pending set $P_j$ may store one or more transactions tx for which the result of the speculative execution does not change even when each transaction tx in the batch that has yet to be committed is committed. For the transactions tx included in the pending set $P_j$, the results of the speculative execution performed when the previous batches $B_j$, $B_{j-1}$, etc. were generated may continue to be used by the leader-side transaction processing section 21 when generating the batch $B_{j+1}$. For example, the access set (R, W) obtained from the speculative execution performed when generating the previous batches $B_j$, $B_{j-1}$, etc. may be added to the access set group 502 when generating the next batch $B_{j+1}$. In this way, for a transaction tx for which the result of the speculative execution does not change, repetition of the speculative execution for the same content is prevented.

Next, the leader-side consensus processing section 24 may reach a consensus for the batch by communicating with the member-side consensus processing sections 34 (Part (3)). If a consensus has been reached for the batch, the leader-side commit processing section 28 may commit each transaction in the batch. In this way, the current state of the database 20 is updated to the state $S_{j+1}$. Then, the leader-side transaction processing section 21 may again speculatively perform parallel execution of the plurality of transactions tx etc. included in the newly generated batch $B_{j+1}$ (Part (1)).

On the other hand, the member-side transaction processing section 35 of a member node 3 may perform speculatively perform parallel execution of the transactions in the batch (Part (4)).

Next, the checking section 36 may check whether there is an access conflict among the plurality of transactions in the batch (Part (5)). For example, for two arbitrary transactions in the batch $B_j$, the checking section 36 may check whether there is an access conflict between reading and writing and whether there is an access conflict between writing and writing.

If there is no access conflict, the member-side commit processing section 38 may commit each transaction in the batch (Part (6)). If there is an access conflict, the transactions in the batch do not need to be committed (Part (7)).

Figure 5:
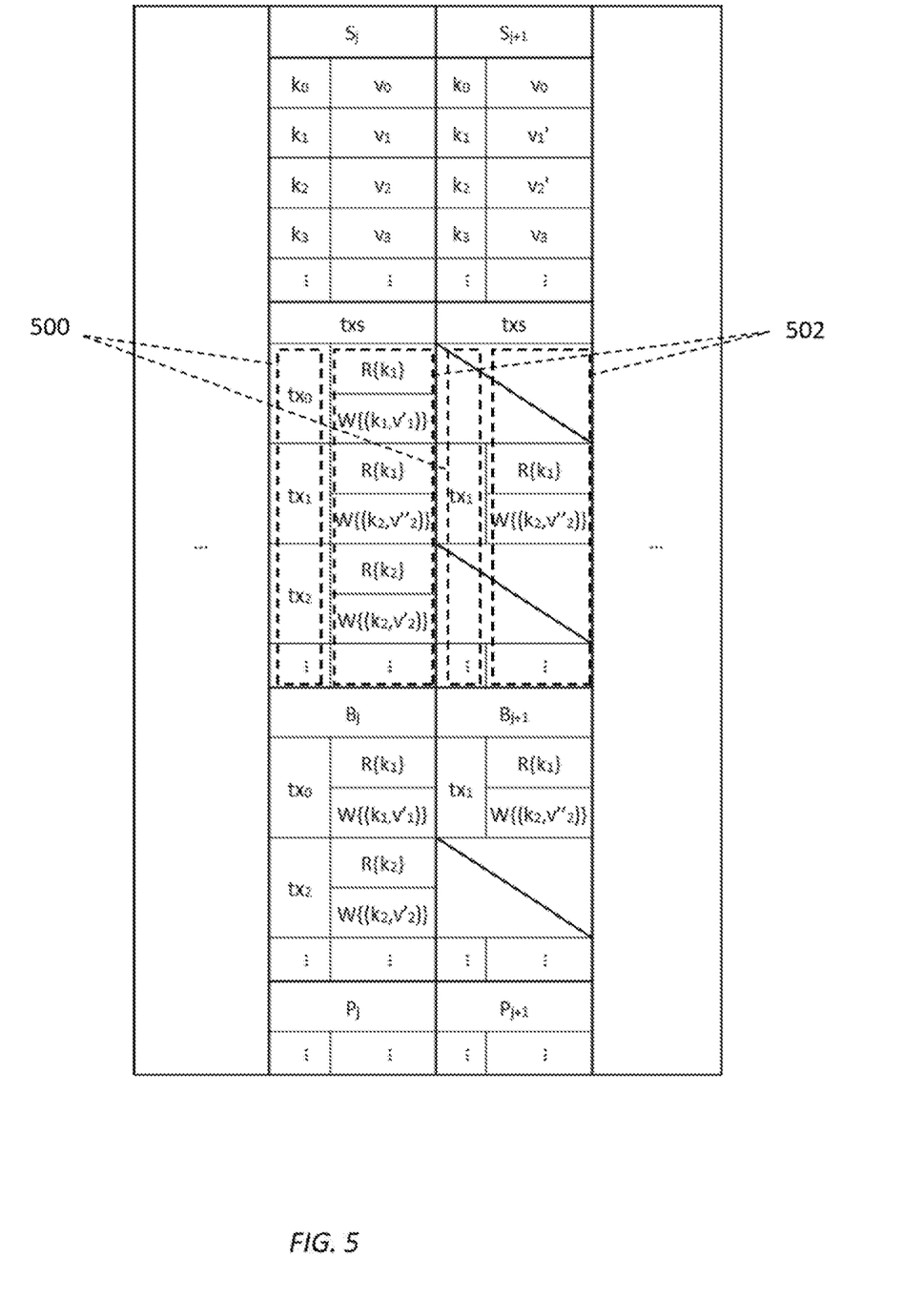
FIG. 5 shows an exemplary transition for the state S of the database, the transaction group, and the batch, in accordance with an embodiment of the present embodiment.

FIG. 5 shows an exemplary transition for the state S of the database 20, the transaction group 500, and the batch B.

In the present embodiment, as an example, when the j-th batch $B_j$ is being generated, the database 20 is in a state $S_j$ in which values $v_0$, $v_1$, $v_2$, $v_3$, etc. are stored in association with keys $k_0$, $k_1$, $k_2$, $k_3$, etc. Furthermore, transactions $tx_0$, $tx_1$, $tx_2$, etc. are included in the transaction group 500 to be executed. The pending set $P_{j-1}$ does not include any transactions tx.

In this state, the leader-side transaction processing section 21 and the access set generating section 22 may perform speculative execution of the transactions $tx_0$, $tx_1$, $tx_2$, etc. and generate the access set group 502 that includes each of these access sets ($R_0$, $W_0$), ($R_1$, $W_1$), ($R_2$, $W_2$), etc. Here, the contents of each of these access sets ($R_0$, $W_0$), ($R_1$, $W_1$), ($R_2$, $W_2$), etc. may respectively be ($\{k_1\}$, $\{(k_1,v'_1)\}$), ($\{k_1\}$, $\{(k_2,v''_2)\}$), ($\{k_2\}$, $\{(k_2,v'_2)\}$), etc.

Next, the batch generating section 23 may judge whether there is an access conflict between the access set ($R^b_j$, $W^b_j$) ($=\varphi,\varphi$)) of the transaction tx in the batch $B_j$ and the access set ($R_0$, ($=(\{k_1\}$, $\{(k_1,v'_1)\}$)) of the oldest transaction $tx_0$, and may add the transaction $tx_0$ to the batch $B_j$. The access set ($R^b_j$, $W^b_j$) of the transaction tx in the batch $B_j$ may be updated as ($\{k_1\}$, $\{(k_1, v_1')\}$).

Next, the batch generating section 23 may check whether there is an access conflict for any of the combinations of ($W^b_j$, ($W^b_j$, and ($R^b_j$, $W_i$). Then the batch generating section 23 may judge that there is an access conflict in the combination of ($W^b_j$, $R_1$) between the access set ($R^b_j$, $W^b_j$) ($=(\{k_1\}$, $\{(k_1,v'_1)\}$)) of the transaction tx in the batch $B_j$ and the access set ($R_1$, $W_1$)($=(\{k_1\}$, $\{(k_2,v''2)\}$)) of the next oldest transaction $tx_1$. In short, the batch generating section 23 may judge that there is an access conflict of $k_1$ between $R^b_j(=\{k_1\})$ and $R_1(=\{k_1\})$. The batch generating section 23 does not need to add the transaction $tx_1$ to the batch $B_j$.

Next, the batch generating section 23 may judge whether there is an access conflict in any of the combinations ($W^b_j$, $R_2$), ($W^b_j$, $W_2$), and ($R^b_j$, $W_2$) between the access set ($R^b_j$, $W^b_j$) ($=(\{k_1\}$, $\{(k_1,v'_1)\}$)) of the transaction tx in the batch $B_j$ and the access set ($R_2$, $W_2$) ($=(\{k_2\}$, $\{(k_2,v'_2)\}$)) of the next oldest transaction $tx_2$. The batch generating section 23 may then add the transaction $tx_2$ to the batch $B_j$. The access set ($R^b_j$, $W^b_j$) of the transaction tx in the batch $B_j$ may be updated as ($\{k_1, k_2\}$, $\{(k_1, v_1')$, $(k_2,v'_2)\}$).

After this, the batch generating section 23 may generate the batch $B_j$ in the same manner. Furthermore, the batch generating section 23 may delete the result of the speculative execution of the transaction $tx_1$ that had an access conflict in the combination ($W^b_j$, $R_1$). The leader-side commit processing section 28 may then commit the transactions $tx_0$, $tx_2$, etc. in the batch $B_j$.

In this way, when the (j+1)-th batch $B_{j+1}$ is being generated, the database 20 is in a state $S_{j+1}$ in which values $v_0$, $v_1'$, $v_2'$, $v_3$, etc. are stored in association with keys $k_0$, $k_1$, $k_2$, $k_3$, etc. Furthermore, transactions $tx_1$, etc. are not included in the batch or in the transaction group 500 to be executed.

In this state, the leader-side transaction processing section 21 and the access set generating section 22 may perform speculative execution of the transactions $tx_1$, etc. and generate the access set group 502 that includes each of these access sets ($R_1$, $W_1$), etc. ($=(\{k_1\}$, $\{(k_2, v''_2)\}$), etc.).

Next, the batch generating section 23 may judge whether there is an access conflict between the access set ($R^b_{j+1}$, $W^b_{j+1}$) ($=\varphi,\varphi$)) of the transaction tx in the batch $B_{j+1}$ and the access set ($\{k_1\}$, $\{(k_2, v''2)\}$) of the oldest transaction $tx_1$, and may add the transaction $tx_1$ to the batch $B_{j+1}$.

After this, the batch generating section 23 may generate the batch $B_{j+1}$ in the same manner.

(3. Modifications)

In the embodiment described above, after the transactions in the batch $B_j$ have been committed, the leader-side transaction processing section 21 starts the speculative execution for the remaining transactions to generate the batch $B_{j+1}$. However, the leader-side transaction processing section 21 may start the speculative execution for the remaining transactions to generate the batch $B_{j+1}$ before the committing of the one batch $B_j$ or a plurality of batches $B_j$, $B_{j-1}$, etc. (e.g., before a consensus is reached for one or more batches). In this way, the batch generation period may be shortened.

In addition to this, when performing the speculative execution for the remaining transactions to generate the batch $B_{j+1}$, the leader-side transaction processing section 21 may speculatively read data concerning the schedule for writing the uncommitted transactions in the batch $B_j$ or the plurality of batches $B_j$, $B_{j-1}$, etc. to the database 20. For example, the leader-side transaction processing section 21 may search for one or more entries of a write set W corresponding to one or more entries of a read set $R_i$ of a transaction $tx_i$ speculatively executed to generate the batch $B_j$, from among the access sets $(R^b_j, W^b_j)$, $(R^b_{j-1}, W^b_{j-1})$, etc. of the plurality of uncommitted transactions tx included in the one or more batches $B_j$, $B_{j-1}$, etc. The leader-side transaction processing section 21 may perform the search in order from the newest batch $B_j$. If one or more entries of the write set W corresponding to one or more entries of the read set $R_i$ are detected, the leader-side transaction processing section 21 may perform the speculative execution of the transaction $tx_i$ using the scheduled write values for these entries speculatively as the read value. In this way, even when a transaction in a previous batch is not committed, it is possible to perform speculative execution for the next batch. If one or more entries of the write set W corresponding to one or more entries of the read entry $R_i$ are not detected, the leader-side transaction processing section 21 may perform the speculative execution of the transaction $tx_i$ by reading the values stored in the read set $R_i$ in the database 20.

Instead of or in addition to this, when performing speculative execution of the remaining transactions to generate the batch $B_{j+1}$, the leader-side transaction processing section 21 may use the previous speculative execution results obtained for transactions that did not have a write-read conflict with other transactions that have already been executed to generate a batch. For example, when performing speculative execution of transactions to generate the batch $B_{j+1}$, the leader-side transaction processing section 21 may continue to use the previous speculative execution results for transactions whose reading is not in conflict with the writing of each transaction that was speculatively executed when generating the uncommitted batches $B_j, \ldots, B_{j-k}$. In this way, repetitive performance of the speculative execution with the same content is prevented.

The above describes an example in which a member node 3 performs transactions in a batch on a condition that a consensus has been reached for the batch, but instead, the member node 3 may perform the transactions without reaching a consensus for the batch. For example, the member node 3 may start the speculative execution of the transactions in a batch when the batch is received, and also attempt to reach a consensus for the batch. If a consensus is not reached, the member node 3 may delete the results of the speculative execution and perform the leader switching process.

The above describes an example in which the leader node 2 includes the leader-side transaction processing section 21, but the leader node 2 does not need to include the leader-side transaction processing section 21. In such a case, the leader node 2 may receive the execution results of the transaction according to the member-side transaction processing section 35 of one of the member nodes 3, and use these execution results in the processing.

The above describes an example in which the leader node 2 and the plurality of member nodes 3 respectively include leader switching sections 29 and 39, but at least some of the nodes do not need to include leader switching sections. In this case, a new leader node 2 is selected from among the plurality of nodes including the leader switching section 29 or a leader switching section 39, and the remaining nodes may be set to be member nodes 3. Furthermore, a leader switching section may be implemented in the distributed system 100 as an apparatus separate from the leader node 2 and the plurality of member nodes 3.

Figure 6:
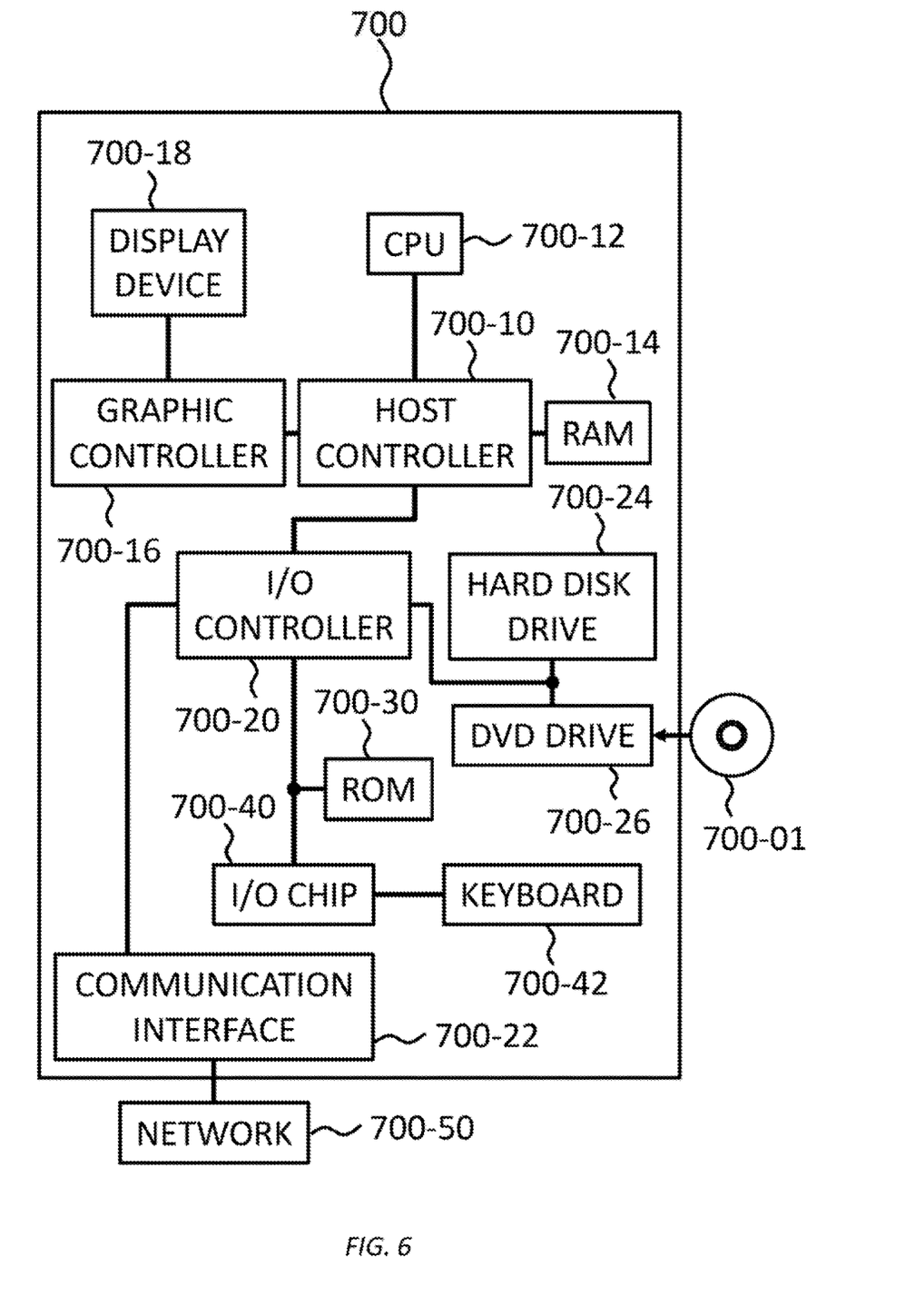
FIG. 6 shows an exemplary hardware configuration of a computer, in accordance with an embodiment of the present embodiment.

FIG. 6 shows an exemplary hardware configuration of a computer configured to perform the foregoing operations, according to an embodiment of the present invention. A program that is installed in the computer 700 can cause the computer 700 to function as or perform operations associated with apparatuses of the embodiments of the present invention or one or more sections (including modules, components, elements, etc.) thereof, and/or cause the computer 700 to perform processes of the embodiments of the present invention or steps thereof. Such a program may be executed by the CPU 700-12 to cause the computer 700 to perform certain operations associated with some or all of the blocks of flowcharts and block diagrams described herein.

The computer 700 according to the present embodiment includes a CPU 700-12, a RAM 700-14, a graphics controller 700-16, and a display device 700-18, which are mutually connected by a host controller 700-10. The computer 700 also includes input/output units such as a communication interface 700-22, a hard disk drive 700-24, a DVD-ROM drive 700-26 and an IC card drive, which are connected to the host controller 700-10 via an input/output controller 700-20. The computer also includes legacy input/output units such as a ROM 700-30 and a keyboard 700-42, which are connected to the input/output controller 700-20 through an input/output chip 700-40.

The CPU 700-12 operates according to programs stored in the ROM 700-30 and the RAM 700-14, thereby controlling each unit. The graphics controller 700-16 obtains image data generated by the CPU 700-12 on a frame buffer or the like provided in the RAM 700-14 or in itself, and causes the image data to be displayed on the display device 700-18.

The communication interface 700-22 communicates with other electronic devices via a network 700-50. The hard disk drive 700-24 stores programs and data used by the CPU 700-12 within the computer 700. The DVD-ROM drive 700-26 reads the programs or the data from the DVD-ROM 700-01, and provides the hard disk drive 700-24 with the programs or the data via the RAM 700-14. The IC card drive reads programs and data from an IC card, and/or writes programs and data into the IC card.

The ROM 700-30 stores therein a boot program or the like executed by the computer 700 at the time of activation, and/or a program depending on the hardware of the computer 700. The input/output chip 700-40 may also connect various input/output units via a parallel port, a serial port, a keyboard port, a mouse port, and the like to the input/output controller 700-20.

A program is provided by computer readable media such as the DVD-ROM 700-01 or the IC card. The program is read from the computer readable media, installed into the hard disk drive 700-24, RAM 700-14, or ROM 700-30, which are also examples of computer readable media, and executed by the CPU 700-12. The information processing described in these programs is read into the computer 700, resulting in cooperation between a program and the above-mentioned various types of hardware resources. An apparatus or method may be constituted by realizing the operation or processing of information in accordance with the usage of the computer 700-

For example, when communication is performed between the computer 700 and an external device, the CPU 700-12 may execute a communication program loaded onto the RAM 700-14 to instruct communication processing to the communication interface 700-22, based on the processing described in the communication program. The communication interface 700-22, under control of the CPU 700-12, reads transmission data stored on a transmission buffering region provided in a recording medium such as the RAM 700-14, the hard disk drive 700-24, the DVD-ROM 700-01, or the IC card, and transmits the read transmission data to network 700-50 or writes reception data received from network 700-50 to a reception buffering region or the like provided on the recording medium.

In addition, the CPU 700-12 may cause all or a necessary portion of a file or a database to be read into the RAM 700-14, the file or the database having been stored in an external recording medium such as the hard disk drive 700-24, the DVD-ROM drive 700-26 (DVD-ROM 700-01), the IC card, etc., and perform various types of processing on the data on the RAM 700-14. The CPU 700-12 may then write back the processed data to the external recording medium.

Various types of information, such as various types of programs, data, tables, and databases, may be stored in the recording medium to undergo information processing. The CPU 700-12 may perform various types of processing on the data read from the RAM 700-14, which includes various types of operations, processing of information, condition judging, conditional branch, unconditional branch, search/replace of information, etc., as described throughout this disclosure and designated by an instruction sequence of programs, and writes the result back to the RAM 700-14. In addition, the CPU 700-12 may search for information in a file, a database, etc., in the recording medium. For example, when a plurality of entries, each having an attribute value of a first attribute is associated with an attribute value of a second attribute, are stored in the recording medium, the CPU 700-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 700. In addition, a recording medium such as a hard disk or a RAM provided in a server system connected to a dedicated communication network or the Internet can be used as the computer readable media, thereby providing the program to the computer 700 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above description, with the embodiments of the present invention, it is possible to increase the speed of the transaction processing with the member nodes 3, in a state where access conflicts among the transactions of each member node 3 have been avoided.

What is claimed is:

1. A computer-implemented method, comprising:
generating an access set, which is a set of database entries to be accessed by each of a plurality of transactions, which are to be executed for a database of replica of common data in each of a plurality of member nodes that each store the database; and
generating a batch that is to be executed by each of the plurality of member nodes and includes two or more transactions that lack an access conflict, based on the access set of each of the plurality of transactions to be executed;
performing parallel execution of any of the plurality of transactions included in the batch including performing speculative execution for remaining transactions among the plurality of transactions to be executed to generate a next batch;
performing a process to reach a consensus for the batch with the plurality of member nodes; and
committing the two or more transactions included in the batch, in response to a consensus being reached for the batch among the computer and the plurality of member nodes.

2. The computer-implemented method according to claim 1, wherein performing the parallel execution includes performing speculative execution of the plurality of transactions to be executed, and wherein the generating the access set includes generating the access set of each of the plurality of transactions to be executed, based on results of the speculative execution.

3. The computer-implemented method according to claim 1, wherein the speculative execution is started after the two or more transactions included in the batch have been committed.

4. The computer-implemented method according to claim 1, wherein the speculative execution is started before the two or more transactions included in the batch have been committed.

5. The computer-implemented method according to claim 4, wherein performing the parallel execution includes, when performing the speculative execution of the remaining transactions to generate the next batch, speculatively reading data scheduled to be written to the database by uncommitted transactions in the batch.

6. The computer-implemented method according to claim 4, wherein performing the parallel execution includes, when performing the speculative execution of the remaining transactions to generate the next batch, uses results of a previous speculative execution for transaction that did not have a write-read conflict with other transactions that had already been executed to generate the batch or a previous batch.

* * * * *